US008930060B1

(12) United States Patent
Lu et al.

(10) Patent No.: US 8,930,060 B1
(45) Date of Patent: Jan. 6, 2015

(54) POST-IMPACT PATH ASSIST FOR VEHICLES

(71) Applicant: Ford Global Technologies, LLC, Dearborn, MI (US)

(72) Inventors: Jianbo Lu, Northville, MI (US); Stephen W. Rouhana, Plymouth, MI (US)

(73) Assignee: Ford Global Technologies, Dearborn, MI (US)

( * ) Notice: Subject to any disclaimer, the term of this patent is extended or adjusted under 35 U.S.C. 154(b) by 7 days.

(21) Appl. No.: 13/941,894

(22) Filed: Jul. 15, 2013

(51) Int. Cl.
*G01C 22/00* (2006.01)
*G05D 1/00* (2006.01)

(52) U.S. Cl.
CPC ................................ *G05D 1/0055* (2013.01)
USPC ........... 701/25; 701/29.1; 701/31.4; 701/519; 340/438

(58) Field of Classification Search
CPC .................... B60W 2250/402; B60W 30/085; B60W 30/095; B60W 30/09; B60W 40/072
USPC ................ 701/29.1, 31.4, 301, 514, 519, 25; 340/438
See application file for complete search history.

(56) References Cited

U.S. PATENT DOCUMENTS

| 7,447,592 B2 * | 11/2008 | Yopp et al. ............... 701/301 |
| 8,346,480 B2 * | 1/2013 | Trepagnier et al. .......... 701/514 |
| 8,412,449 B2 * | 4/2013 | Trepagnier et al. .......... 701/301 |

* cited by examiner

*Primary Examiner* — Gertrude Arthur Jeanglaude
*(74) Attorney, Agent, or Firm* — Frank MacKenzie

(57) ABSTRACT

An environment monitor has a plurality of sensors for detecting predetermined safety risks associated with a plurality of potential destination regions around a vehicle as the vehicle moves over a roadway. The environment monitor selects one of the potential destination regions having a substantially lowest safety risk as a target area. A path determination unit assembles a plurality of plausible paths between the vehicle and the target area, monitors predetermined safety risks associated with the plurality of plausible paths, and selects one of the plausible paths having a substantially lowest safety risk as a target path. An impact detector detects an impact between the vehicle and another object. A stability control is configured to autonomously steer the vehicle onto the target path when the impact is detected.

21 Claims, 3 Drawing Sheets

POST-IMPACT PATH ASSIST FOR VEHICLES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to autonomous vehicle control, and, more specifically, to planning and following a post-impact path that reduces risks of secondary crash events.

Several vehicle control systems currently exist which are used to augment the driving capability of a vehicle operator such as antilock brake systems (ABS), traction control systems (TCS), and stability control systems (SC). Examples of stability control systems include electronic stability control (ESC) systems (sometimes referred to as yaw stability control (YSC) systems) and roll stability control (RSC) systems. ESC systems are also sometimes called ESP (Electronic Stability Program) systems or DSTC (Dynamic Stability Traction Control) systems.

The stability control systems are utilized to maintain controlled and stable vehicle operations for improved vehicle and occupant safety. The stability control systems are often used to maintain control of a vehicle following a driver's desired travel direction, to prevent the vehicle from spinning out, and/or to prevent or mitigate a roll over event. For example, a yaw stability control system typically compares the driver's desired heading based upon the steering wheel angle with the path of travel as determined from motion sensors located on the vehicle. By regulating the amount of braking at each corner of the vehicle and the traction force of the vehicle, the desired path of travel may be maintained.

Existing stability control systems correct undesired vehicle motion caused by a tire force disturbance (TFD), such as a tire force differential due to a road surface disturbance or due to a mismatch between the driving intention of a driver and a road surface condition. This mismatch usually happens when there is a significant difference between the front and the rear tire lateral forces applied to the vehicle (referred to as the lateral tire force differential), or there is a significant difference between the right and the left tire longitudinal tire forces (referred to as the longitudinal tire force differential), or a combination thereof.

An undesired yaw motion may also be generated by a yaw moment disturbance caused when a vehicle receives a force disturbance other than a tire force disturbance. A body force disturbance (BFD) may occur when a vehicle hits a fixed object, such as a tree, or when the vehicle is hit by another moving object, such as a vehicle. A body force disturbance may also occur when the vehicle experiences a sudden strong wind gust applied to the vehicle body. While the magnitude of the tire force disturbance is limited by the driving condition of the road surface, the magnitude of a body force disturbance can be essentially unlimited. For example, the collision of two moving vehicles may generate a body force disturbance with a magnitude that is several factors larger than the total tire forces. A yaw motion may be generated when a vehicle receives a body force disturbance from an external source, resulting in an altered vehicle trajectory or path which can result in a secondary impact event. In many situations, the risk of injury or damage can be much greater from a secondary event than from the primary event.

Stability control systems aid a vehicle driver in pursuing an intended action or trajectory. As a result of the impending or actual application of a body force disturbance, however, a driver may panic and perform driving tasks that are inappropriate or drastic in an attempt to avoid receiving the external body force disturbance which can lead to further undesirable events. Some studies have shown that about one third of all vehicle-to-vehicle accidents that cause severe injuries involve more than one impact. A relatively small first impact is very often followed by a severe second impact. This second impact can include one of many types of impacts, such as vehicle-to-vehicle collisions, vehicle-to-object collisions, tripped or untripped roll-overs, and road departures.

It would be desirable to automatically react to impact events while taking into account to possibility of erroneous driver's action in a manner that reduces the likelihood and/or severity of secondary impact events.

SUMMARY OF THE INVENTION

In one aspect of the invention, a vehicle is comprised of an environment monitor having a plurality of sensors for detecting predetermined safety risks associated with a plurality of potential destination regions around the vehicle as the vehicle moves over a roadway. The environment monitor selects one of the potential destination regions having a substantially lowest safety risk (e.g., risk of a secondary collision) as a target area. A path determination unit assembles a plurality of plausible paths between the vehicle and the target area, monitors predetermined safety risks associated with the plurality of plausible paths, and selects one of the plausible paths having a substantially lowest safety risk as a target path. An impact detector detects an impact between the vehicle and another object. A stability control is configured to autonomously steer the vehicle onto the target path when the impact is detected.

DETAILED DESCRIPTION OF PREFERRED EMBODIMENTS

Figure 1:
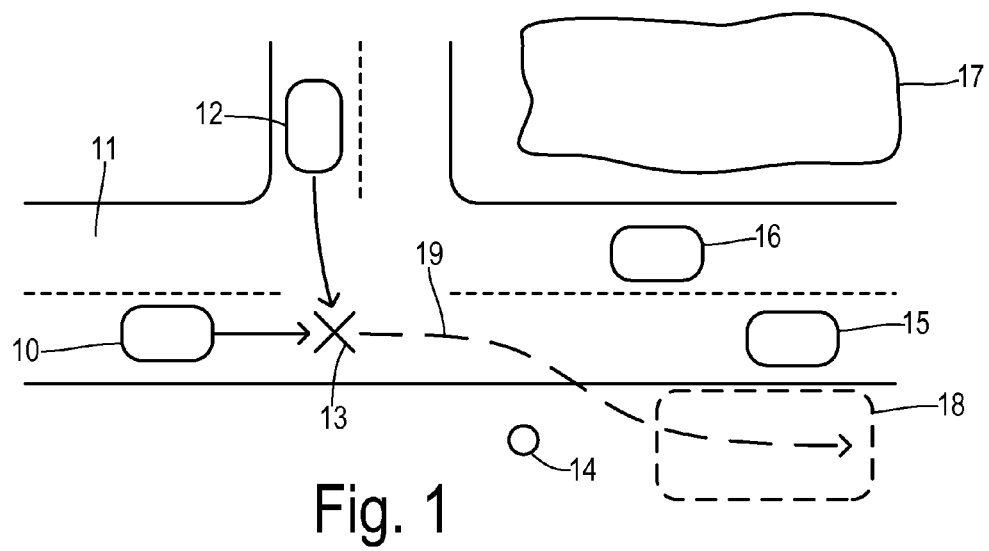
FIG. 1 depicts an initial collision and a safe path to follow after the impact.

According to the present invention, when a vehicle has received an impact which may have put it on course to hit another object or to move along an unfavorable path (e.g., a heavy traffic lane or an unsafe situation such as a lake or a steep slope), an autonomous vehicle control system such as torque vectoring, active steering, active braking, or active throttling is engaged in order to initiate a path correction action to avoid the unfavorable path.

An apparatus of the invention may prevent further occupant injury after a primary crash. A sensing system is used to monitor surroundings and identify an area $A_{LR}$ having a substantially lowest risk of potential secondary crashes if the host vehicle would move into that area. A plausible path determination unit assembles all the plausible paths that could be followed to reach the low risk area $A_{LR}$. A path planning system working in or with the path determination unit selects a path having a substantially lowest safety risk out of all the plausible paths. Identification of a low risk area $A_{LR}$ and selection of a path are performed substantially continuously while the vehicle is in motion so that they can be immediately used in the event of a collision. An impact detection system detects the occurrence of an impact. In response to the impact, a vehicle stabilization means is activated in order to follow the selected path. Preferably, the sensing and path planning systems continue to monitor changing risks and the selected path is appropriately updated according to the changing risks.

The sensing system may preferably evaluate predetermined safety risks in order to identify the lowest risk area $A_{LR}$ and the lowest risk path based on information from radar sensors, lidar sensors, ultrasonic sensors, vision sensors (cameras), night vision, or other sensors (many of which may be already present on a vehicle in connection with a forward collision warning system, an adaptive cruise control system, or a reverse parking aid) or from remote information obtained from vehicle-to-infrastructure systems, vehicle-to-vehicle communication systems, cloud communication systems, or from navigation and digital map systems.

The lowest risk area $A_{LR}$ can be identified by excluding areas in a surrounding grid that have a high probability of secondary collision or other hazards, using all available environmental sensors. Such hazards could include an area or path leading to a lake, a steep hill, an off-road terrain with embankment, a heavy traffic region with oncoming traffic flow, a potential vehicle-to-vehicle impact, an area which might cause tripped rollover, or a path towards fixed objects such as poles, trees, and buildings.

The impact detector may include vehicle crash sensors, vehicle motion sensors, or other post-impact stability control sensors. The vehicle stabilization control used to follow the desired path after impact may preferably be the same as what is used on the vehicle to provide driver assistance prior to the impact event. The invention constantly calculates the lowest risk paths during driving and then uses a first impact as a trigger to initiate autonomous driving functions through torque vectoring, active steering, active braking, active throttling, or active steering assist (EPAS), for example. An autonomous driving function after the vehicle receives an impact can force a vehicle to move along a safe path even if a driver's control commands are absent or represent inappropriate control actions. In the event that the driver is correctly steering the vehicle towards the safe path direction, then the invention can facilitate the driver's control in a timely fashion. If the vehicle's kinetic energy can be attenuated enough to bring it to a stop inside the lowest risk area, then the autonomous driving function can also be used to stop the vehicle.

Referring now to FIG. 1, a host vehicle 10 is moving over a roadway 11 toward an intersection. A second moving vehicle 12 is shown entering the intersection to cause a collision, with the impact occurring at a position 13. The trajectory of host vehicle 10 is altered by the collision. Vehicle 10 could be put on course toward a secondary impact with a fixed pole 14, nearby vehicles 15 and 16, or a pond 17, for example. The driver may be unable to steer to a safe area or may inadvertently initiate control actions inconsistent with avoiding a secondary impact. Therefore, the present invention automatically identifies a safe area 18 having a lowest safety risk together with a path 19 with the best likelihood of safely reaching area 18.

Using remote sensing to identify potential safety risks, the present invention utilizes a grid 20 divided into a plurality of potential destination regions laid out over the area in the immediate vicinity of vehicle 10. Some of the potential destination regions are numbered 21-25, 28, 31-34, 38, and 40-44. Each potential destination region lies at a respective heading angle and respective distance from vehicle 10, and may preferably have a width and length with approximately the same size and shape as a footprint of vehicle 10. Using remote object detection, classification, and tracking, each detected occurrence of a safety risk is mapped to the corresponding potential destination regions. For example, any sites where a secondary collision event is expected to occur (e.g., with a fixed obstacle or a moving object, or having unsafe road surface properties or steep grades) may be excluded from consideration as either a safe target area or a safe path. Thus, a plurality of regions 40-43 are shaded as an indication that they will be avoided in selecting the target area or target path.

Figure 2:
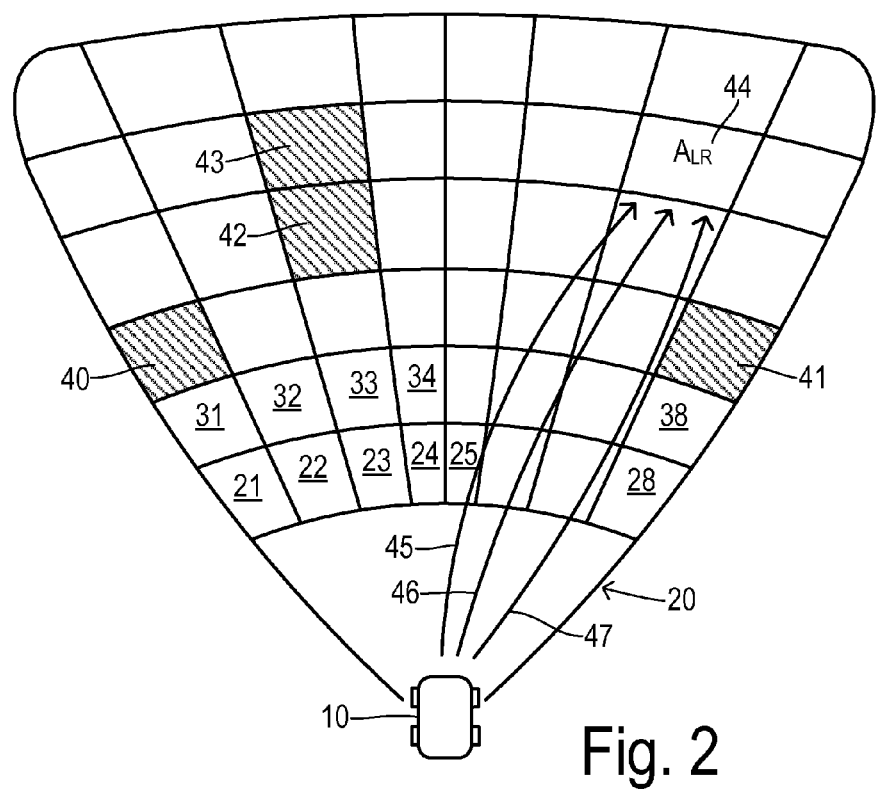
FIG. 2 is a diagram showing a grid used to identify a safest area and a safest path to reach it.

For any regions not excluded from consideration, other safety risks may be quantified and other factors taken into consideration in assigning a risk value. A particular risk value may reflect the proximity of a region to other regions representing known safety risks, for example. In FIG. 2, a region 44 has been evaluated as having the lowest safety risk. Thus, it becomes a target area of lowest risk $A_{LR}$ under the present invention.

Once target area $A_{LR}$ has been selected, a plurality of plausible paths 45-47 are assembled (i.e., defined) based on various properties of the vehicle control system, a sensed vehicle state, and an avoidance of any excluded regions (e.g., region 41). The safety risks associated with each plausible path are monitored, and the evaluation of the safety risks for each plausible path is used to select a target path having a substantially lowest safety risk. Grid 20 is preferably constantly evaluated during vehicle movement so that the target area and target path are continuously updated, making them available immediately upon detection of an impact event. In response to the impact, a stability control function is initiated to autonomously steer the vehicle onto the target path as described below. If possible, the stability control may also stop the vehicle in the target area.

Figure 3:
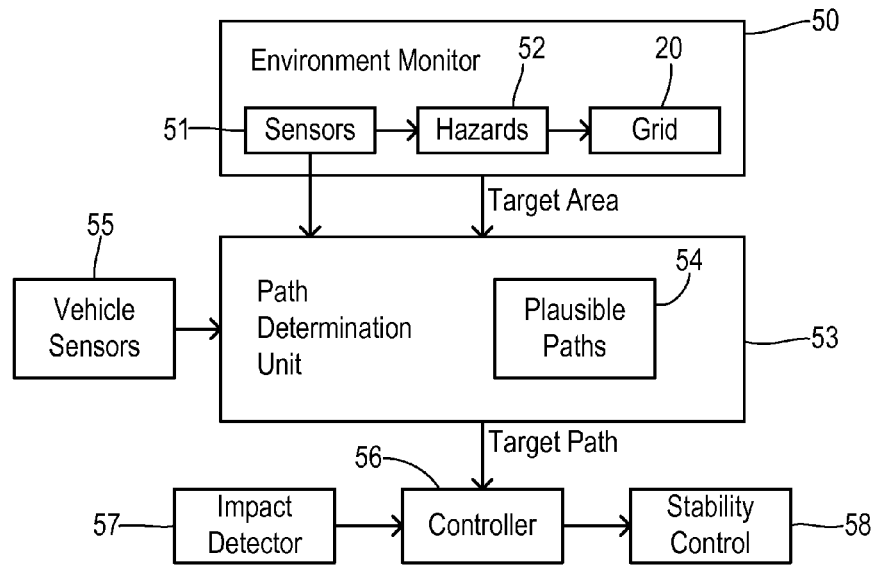
FIG. 3 is a block diagram showing one embodiment of apparatus according to the present invention.

FIG. 3 shows a preferred apparatus of the invention, including an environment monitor 50 equipped with various sensors 51 for detecting predetermined safety risks associated with the potential destination regions around the vehicle. Based on the sensor inputs, environment monitor 50 evaluates a plurality of hazards which are recorded in a hazard block 52 and which are correlated with respective regions of grid 20. Based on the evaluation of hazards 52 in grid 20, a target area is selected and then is identified to a path determination unit 53. A plurality of plausible paths 54 are assembled within path determination unit 53 and the safety risks associated with each path are monitored based on information from sensors 51 and a plurality of vehicle sensors 55 (which can be used to determine the maneuverability of the vehicle, for example). The one of the plausible paths that has a lowest safety risk is selected as a target path, and the target path is identified to a post-impact path assist controller 56. An impact detector 57 is coupled to controller 56 and provides a triggering signal when it detects an impact between the vehicle and another object. Controller 56 does nothing with the continuously-generated target path information until an impact is detected. At that time, controller 56 interacts with a stability control 58 for autonomously steering the vehicle onto the target path.

Figure 4:
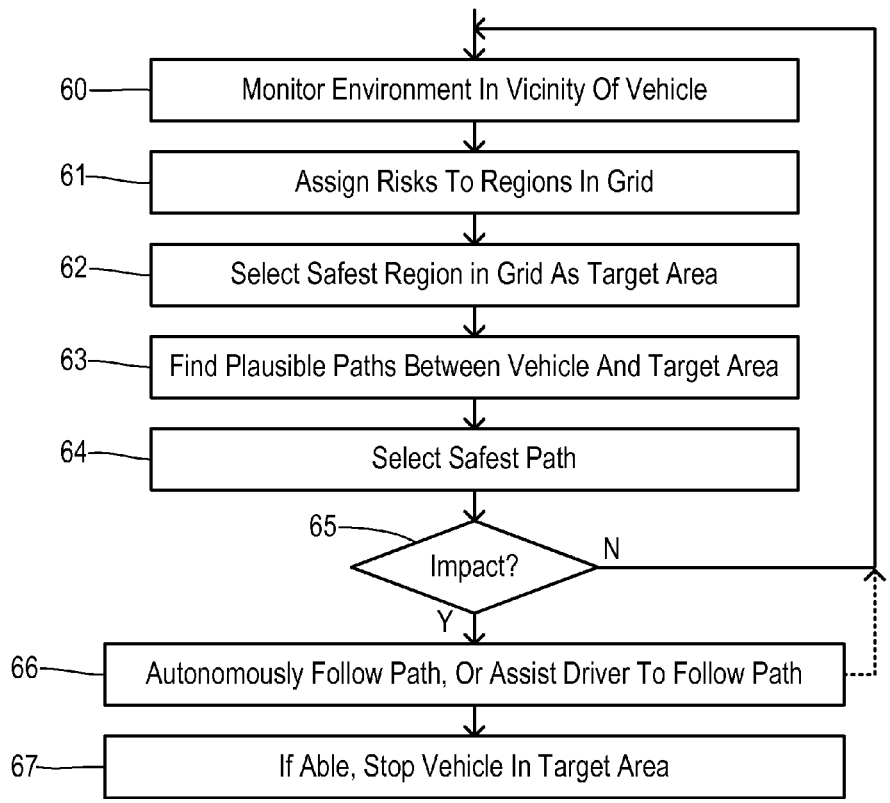
FIG. 4 is a flowchart showing one preferred method of the invention.

A general method of the invention is shown in FIG. 4 wherein the environment in the vicinity of the vehicle is monitored for predetermined safety risks in step 60. Risks are assigned to regions in the grid in step 61. In step 62, the region having substantially the lowest safety risk is selected as a target area. In step 63, all plausible paths between the vehicle and the target area are found, and the path having a lowest associated safety risk is selected as a safest path in step 64.

A check is performed in step 65 to determine whether an impact has been detected. If there has been no impact, then a return is made to step 64 in order to substantially continuously evaluate the vehicle surroundings and to update the target area and target path. Once an impact is detected, the vehicle autonomously follows the safest path (or assists the driver in the driver's efforts to follow the path) in step 66. In step 67, if the stability control actuator is able to stop the vehicle in the target area, then it preferably does so. After step 66, the method may also preferably return step 60 to continue monitoring the environment in order to reselect a target area and safest path as the risk situation may change in the aftermath of the collision.

Figure 5:
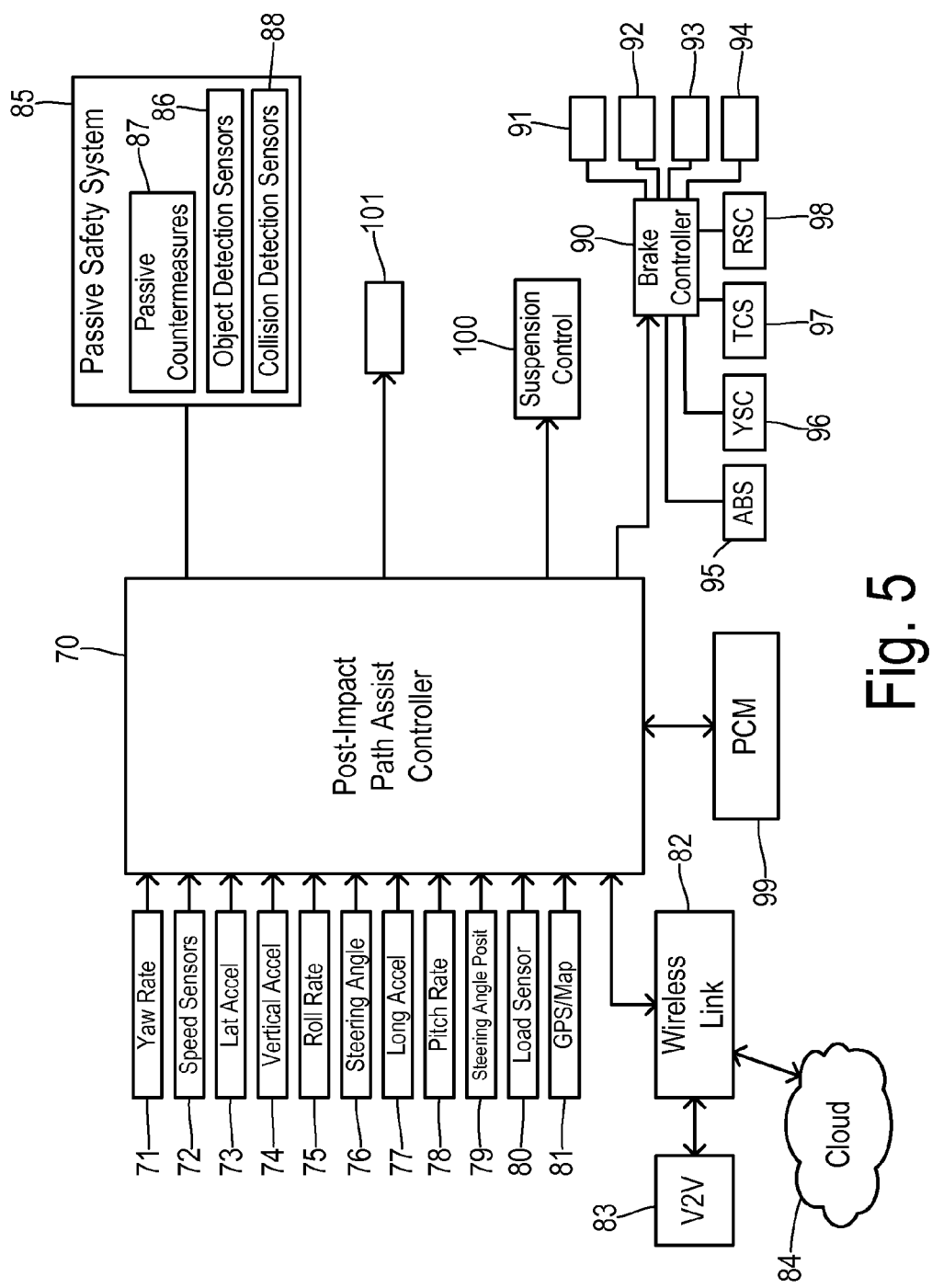
FIG. 5 is a block diagram showing an alternative embodiment.

FIG. 5 shows an embodiment of the invention in greater detail. A post-impact path assist controller 70 may be coupled with a yaw rate sensor 71, speed sensors 72 (e.g., for both vehicle and individual wheel speeds), lateral acceleration sensor 73, vertical acceleration sensor 74, roll rate sensor 75, steering angle sensor 76, longitudinal acceleration sensor 77, pitch rate sensor 78, steering angle position sensor 79, and load sensor 80. A GPS navigation system with a digital map 81 is also connected to controller 70 as a potential source of safety risk information (e.g., location of fixed obstructions or topology). Safety risk information from offboard sources may also be obtained via a wireless link 82 for coupling controller 70 with a vehicle-to-vehicle (V2V) communication system 83 or a cloud-based infrastructure 84.

The vehicle further contains a passive safety system 85 with a plurality of object detection sensors 86 such as radar, lidar, or vision-based remote sensors. Safety system 85 further includes passive countermeasures 87, such as air bags, and collision detection sensors 88 (which may be comprised of dedicated sensors such as accelerometers or may include selected ones of sensors 71-80) to control deployment of countermeasures 87.

The stability control system of the present invention may include a brake controller 90, an engine or powertrain control module (PCM) 99, a suspension controller 100, and/or a steering controller 101. As known in the art, brake controller 90 may individually control brake actuators 91-94 at individual wheels to achieve a brake-steer function and to eventually bring the vehicle to a full stop. Brake controller 90 may preferably be shared with other stability control systems such as an ABS system 95, a YSC system 96, a TCS system 97, and an RSC system 98.

In operation, objects and other safety risks associated with regions around the vehicle are identified and tracked by object detection sensors 86 and are plugged into a grid by controller 70. After identifying a lowest risk area, controller 70 determines plausible paths for reaching the target area by evaluating current vehicle speed and a maximum yaw in order to determine the maximum amount of brake-steer that can be obtained, for example. When a collision is detected by sensors 88, controller 70 activates one of the stability controls such as brake controller 90 in order to put the vehicle onto the previously identified target path and potentially stops the vehicle in the target area.

What is claimed is:

1. A vehicle comprising:
    an environment monitor having a plurality of sensors for detecting predetermined safety risks associated with a plurality of potential destination regions around the vehicle as the vehicle moves over a roadway, wherein the environment monitor selects one of the potential destination regions having a substantially lowest safety risk as a target area;
    a path determination unit assembling a plurality of plausible paths between the vehicle and the target area, monitoring predetermined safety risks associated with the plurality of plausible paths, and selecting one of the plausible paths having a substantially lowest safety risk as a target path;
    an impact detector for detecting an impact between the vehicle and another object; and
    a stability control configured to autonomously steer the vehicle onto the target path when the impact is detected, wherein the environment monitor and the path determination unit select the target area and the target path, respectively, before the impact occurs.

2. The vehicle of claim 1 wherein the predetermined safety risks include fixed obstructions and moving objects representing a potential collision.

3. The vehicle of claim 1 wherein the predetermined safety risks include unsafe surface properties and steep grades.

4. The vehicle of claim 1 wherein the stability control is configured to stop the vehicle in the target area.

5. The vehicle of claim 1 wherein the target area and the target path are updated substantially continuously while the vehicle is moving.

6. The vehicle of claim 5 wherein the target area and the target path continue to be updated after detecting the impact.

7. The vehicle of claim 1 wherein the potential destination regions are comprised of a predetermined grid defined in relation to the vehicle.

8. The vehicle of claim 1 wherein the plurality of sensors includes at least one sensor selected from the group comprising a radar sensor, a lidar sensor, an ultrasonic sensor, an optical sensor, a night vision sensor, a remote communication system, and a geopositioning system.

9. The vehicle of claim 1 wherein the path determination unit assembles the plausible paths according to a current speed and a maximum yaw for the vehicle.

10. A method of controlling a vehicle comprising the steps of:
    monitoring a plurality of sensors for detecting predetermined safety risks associated with a plurality of potential destination regions around the vehicle as the vehicle moves over a roadway;
    selecting one of the potential destination regions having a substantially lowest safety risk as a target area;
    determining a plurality of plausible paths between the vehicle and the target area;
    monitoring predetermined safety risks associated with the plurality of plausible paths;
    selecting one of the plausible paths having a substantially lowest safety risk as a target path;
    detecting an occurrence of an impact of the vehicle with another object, wherein the selection of the target path as one of the plausible paths having a substantially lowest safety risk is made before detection of the impact; and
    activating an autonomous path control to follow the target path to the target area in response to detecting the impact.

11. The method of claim 10 wherein the predetermined safety risks include fixed obstructions and moving objects representing a potential collision.

12. The method of claim 10 wherein the predetermined safety risks include unsafe surface properties and steep grades.

13. The method of claim 10 further comprising the step of stopping the vehicle in the target area.

14. The method of claim 10 wherein the monitoring and selecting steps are performed substantially continuously while the vehicle is moving.

15. The method of claim 14 wherein the target area and the target path continue to be updated after detecting the impact.

16. The method of claim 10 wherein the potential destination regions are comprised of a predetermined grid defined in relation to the vehicle.

17. The method of claim 10 wherein the plurality of sensors includes at least one sensor selected from the group comprising a radar sensor, a lidar sensor, an ultrasonic sensor, an optical sensor, a night vision sensor, a remote communication system, and a geopositioning system.

18. The method of claim 10 wherein the plurality of plausible paths are determined according to a current speed and a maximum yaw for the vehicle.

19. A vehicle comprising:
- an environment monitor having a plurality of sensors for detecting predetermined safety risks associated with a plurality of potential destination regions around the vehicle as the vehicle moves over a roadway, wherein the environment monitor selects one of the potential destination regions having a substantially lowest safety risk as a target area, and wherein the predetermined safety risks include unsafe surface properties and steep grades;
- a path determination unit assembling a plurality of plausible paths between the vehicle and the target area, monitoring predetermined safety risks associated with the plurality of plausible paths, and selecting one of the plausible paths having a substantially lowest safety risk as a target path;
- an impact detector for detecting an impact between the vehicle and another object; and
- a stability control configured to autonomously steer the vehicle onto the target path when the impact is detected.

20. A vehicle comprising:
- an environment monitor having a plurality of sensors for detecting predetermined safety risks associated with a plurality of potential destination regions around the vehicle as the vehicle moves over a roadway, wherein the environment monitor selects one of the potential destination regions having a substantially lowest safety risk as a target area, and wherein the potential destination regions are comprised of a predetermined grid defined in relation to the vehicle;
- a path determination unit assembling a plurality of plausible paths between the vehicle and the target area, monitoring predetermined safety risks associated with the plurality of plausible paths, and selecting one of the plausible paths having a substantially lowest safety risk as a target path;
- an impact detector for detecting an impact between the vehicle and another object; and
- a stability control configured to autonomously steer the vehicle onto the target path when the impact is detected.

21. A vehicle comprising:
- an environment monitor having a plurality of sensors for detecting predetermined safety risks associated with a plurality of potential destination regions around the vehicle as the vehicle moves over a roadway, wherein the environment monitor selects one of the potential destination regions having a substantially lowest safety risk as a target area;
- a path determination unit assembling a plurality of plausible paths between the vehicle and the target area, monitoring predetermined safety risks associated with the plurality of plausible paths, and selecting one of the plausible paths having a substantially lowest safety risk as a target path, wherein the path determination unit assembles the plausible paths according to a current speed and a maximum yaw for the vehicle;
- an impact detector for detecting an impact between the vehicle and another object; and
- a stability control configured to autonomously steer the vehicle onto the target path when the impact is detected.

* * * * *